O. W. BREDEN.
DISTRIBUTING APPARATUS.
APPLICATION FILED APR. 19, 1919.
1,360,493.
Patented Nov. 30, 1920.
5 SHEETS—SHEET 1.
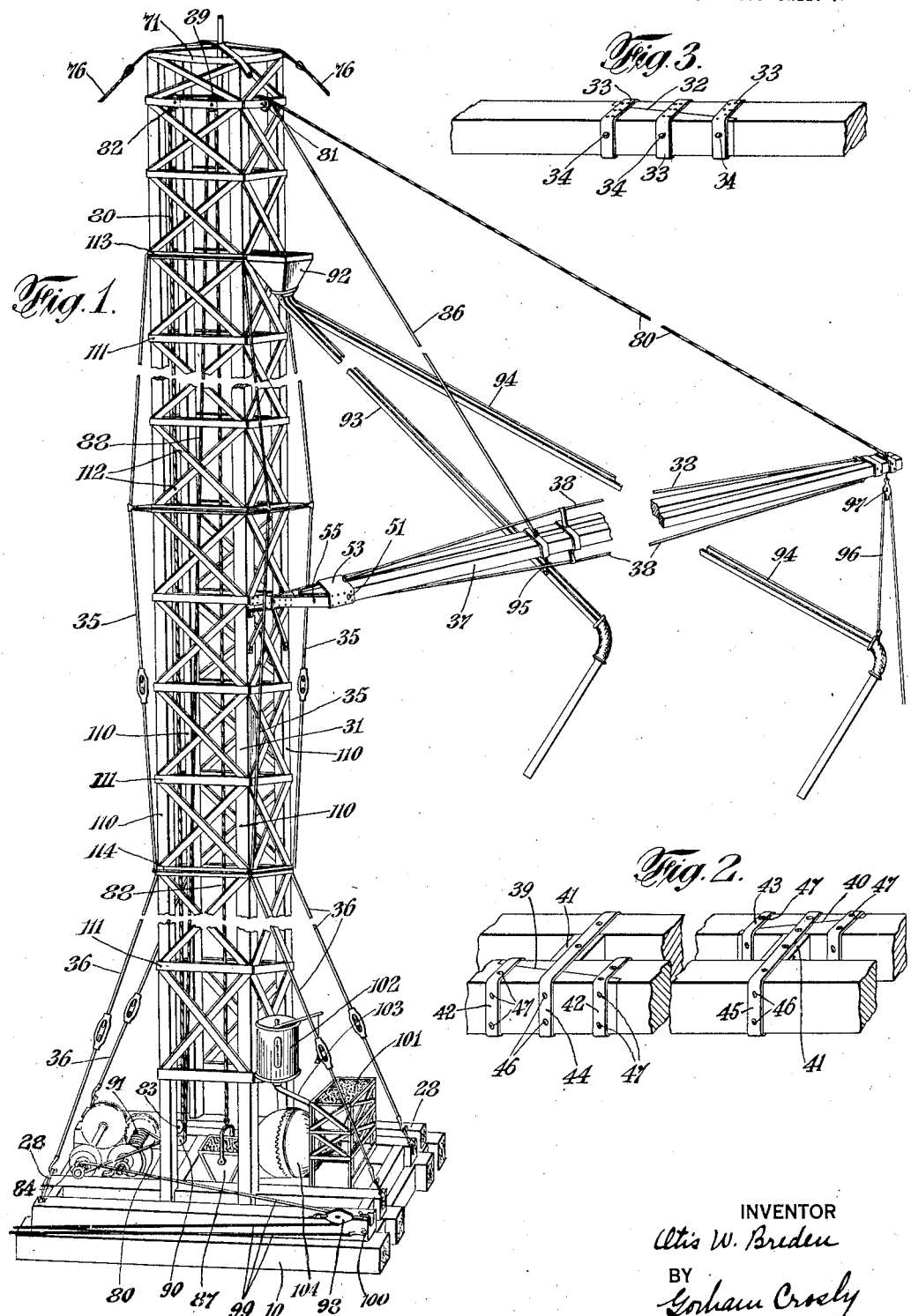
INVENTOR
Otis W. Breden
BY
Gorham Crosly
ATTORNEY O. W. BREDEN.
DISTRIBUTING APPARATUS.
APPLICATION FILED APR. 19, 1919.
1,360,493.
Patented Nov. 30, 1920.
5 SHEETS—SHEET 2.
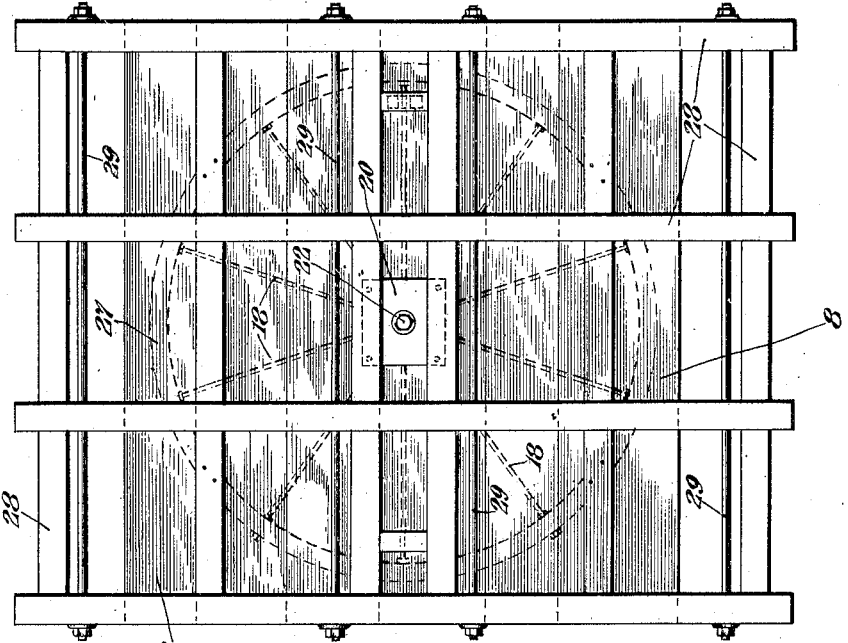
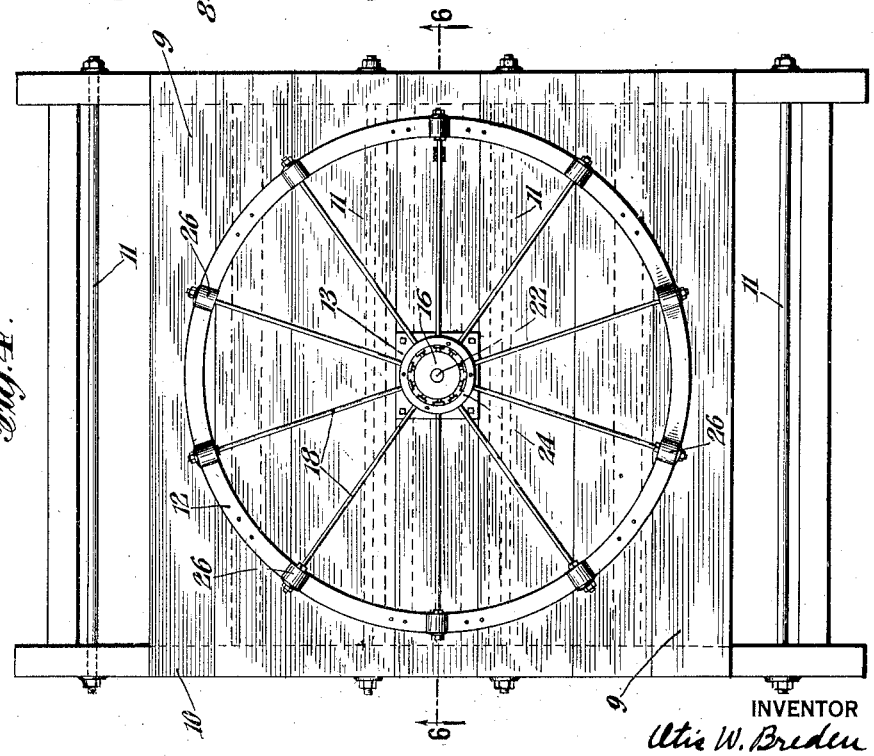
INVENTOR
Otis W. Breden
BY
Gorham Crosby
ATTORNEY O. W. BREDEN.
DISTRIBUTING APPARATUS.
APPLICATION FILED APR. 19, 1919.
1,360,493.
Patented Nov. 30, 1920.
5 SHEETS—SHEET 3.
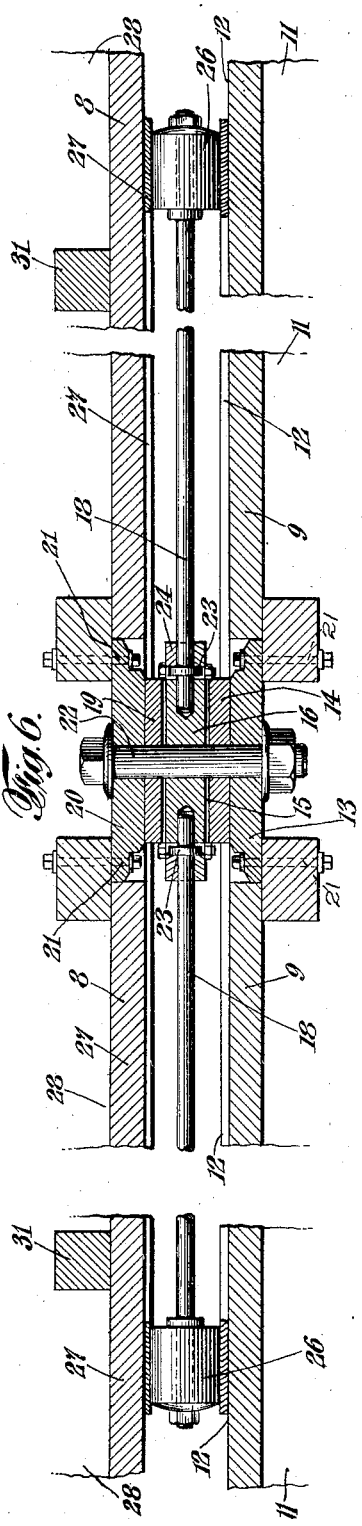
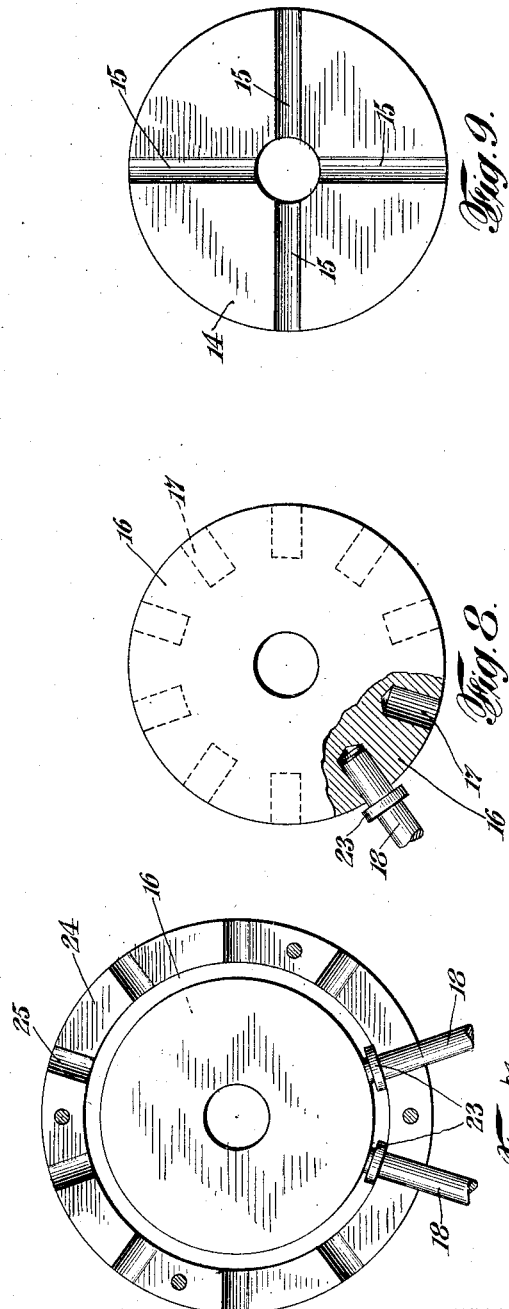
INVENTOR
Otis W. Breden
BY
Gorham Crosby
ATTORNEY

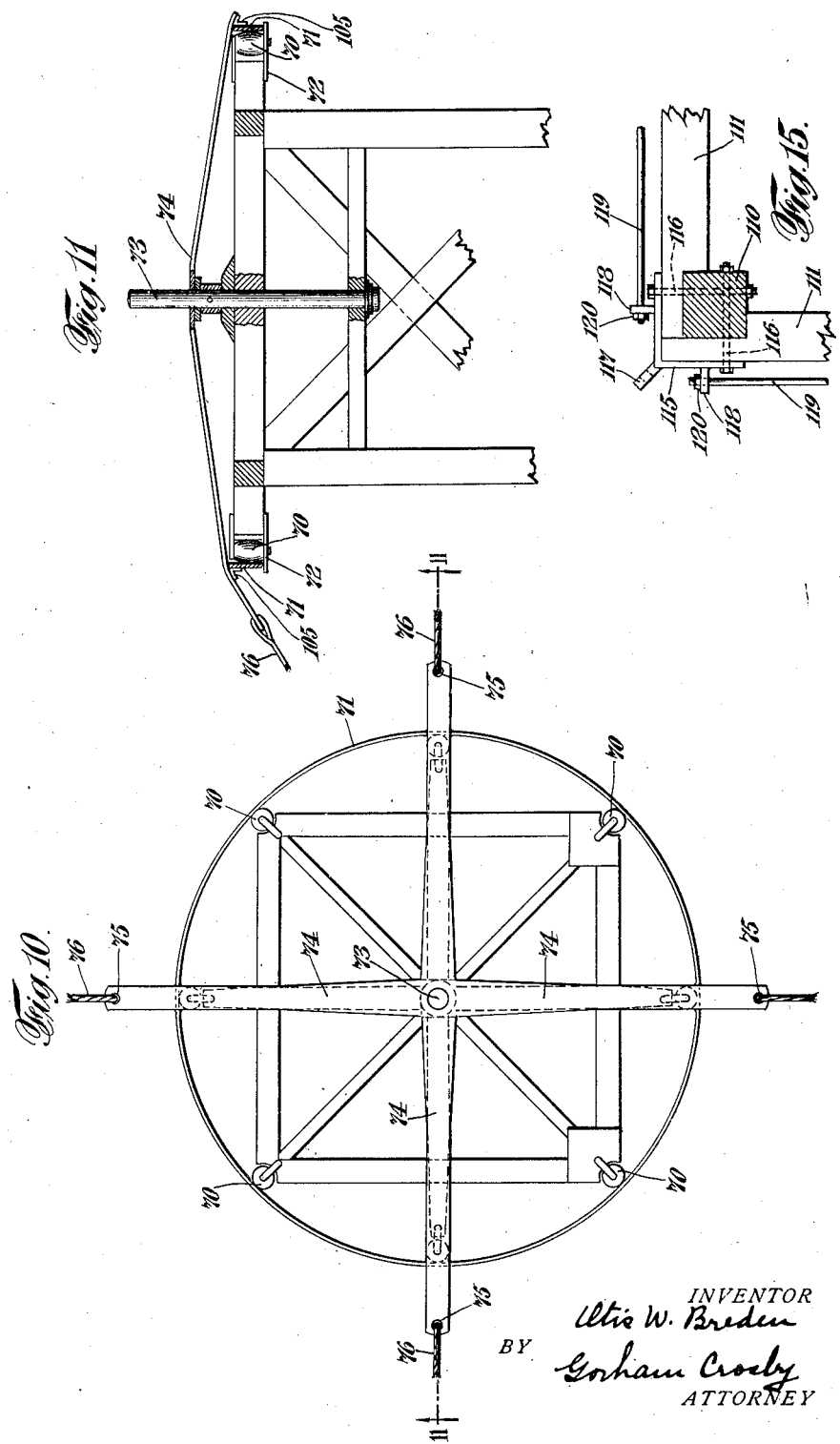

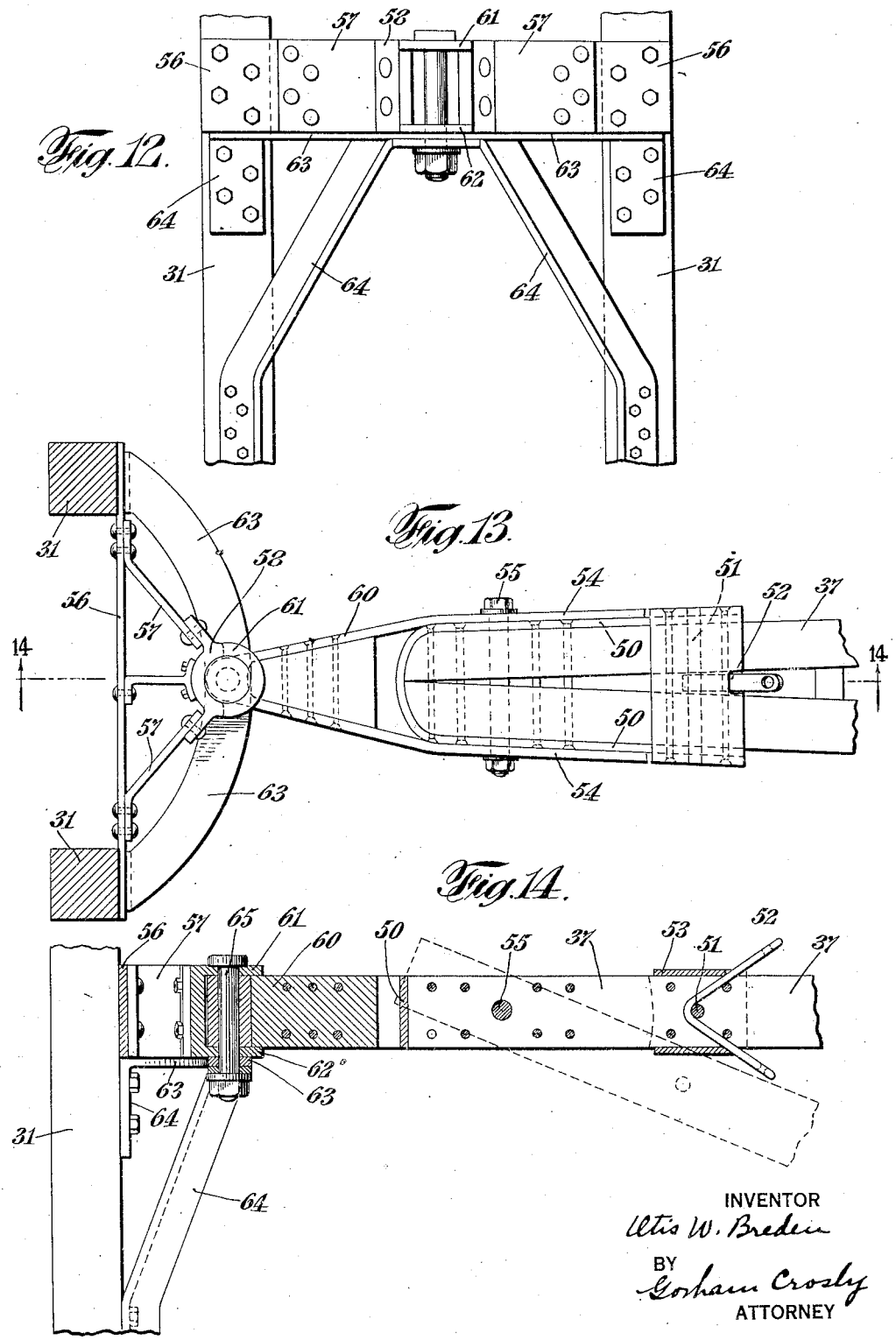

UNITED STATES PATENT OFFICE.

OTIS W. BREDEN, OF PHILADELPHIA, PENNSYLVANIA.

DISTRIBUTING APPARATUS.

1,360,493. Specification of Letters Patent. Patented Nov. 30, 1920.

Application filed April 19, 1919. Serial No. 291,259.

*To all whom it may concern:*

Be it known that I, OTIS W. BREDEN, a citizen of the United States, and a resident of Philadelphia, in the county of Philadelphia and State of Pennsylvania, have invented certain new and useful Improvements in Distributing Apparatus, of which the following is a specification.

My invention relates to improvements in concrete distributing apparatus and the like and is particularly advantageous for use in the building of monolithic structures. The main object of my invention is to provide a simple and efficient form of apparatus which may be easily and cheaply constructed and by means of which concrete or the like may be quickly and efficiently distributed over a wide area and at various heights.

Further and more specific objects, features and advantages will more clearly appear from the detailed description given below taken in connection with the accompanying drawings which form a part of this specification.

In the drawings, Figure 1 is a perspective of an apparatus embodying my improvements in a preferred form and illustrating the tower, its base and other parts in assembled form. Fig. 2 is a detail illustrating certain details of the boom construction. Fig. 3 is a detail illustrating the method of splicing the tower posts. Fig. 4 is a plan view of the base with the track and roller bearings thereon. Fig. 5 is a plan view of the bottom part of the tower. Fig. 6 is a section taken on the line 6—6 of Fig. 4, partly broken away. Figs. 7 and 8 are details illustrating a method of construction of the central portion of the spider carrying the roller bearings. Fig. 9 is a plan view of one of the bearing members for the spider. Fig. 10 is a plan view of the top of the tower illustrating the roller bearings for the top of the tower. Fig. 11 is a section taken on the line 11—11 of Fig. 10. Fig. 12 is a detail illustrating the connections for the boom to the tower. Fig. 13 is a plan view illustrating the method of connecting the boom to the tower. Fig. 14 is a section taken on the line 14—14 of Fig. 13. Fig. 15 is a sectional detail illustrating the tower reinforcing means.

Referring to the drawings and more particularly to Figs. 1, 4 and 5, 10 represents a base constructed of suitable timbers rigidly secured together as by tie rods 11 and substantially covered with a floor 9. Secured on top of the floor 9 is a circular track 12 and also secured to the base is a pivot block 13 (see also Fig. 6). Situated on top of the block 13 is a grease block 14 provided with radial grooves 15 (see also Fig. 9). Situated upon the block 14 is a hub 16 of the spider member, the hub being provided with radial apertures 17 into which loosely fit the ends of spider arms 18. On top of the hub 16 is a block 19 similar to the block 14 and on top of this a bearing block 20 rigidly secured to the bottom part of the tower, as by bolts 21. The members 13, 14, 16, 19 and 20 are properly held together by central pivot bolt 22. Each of the spider arms 18 is provided with a collar 23, and arranged circumferentially around the collars 23 is a split ring 24 each part suitably apertured as at 25 to receive the spider arms 18 and adapted to bear against the collars 23 to prevent the spider arms 18 from coming out of their sockets 17 in the hub 16. Arranged on the ends of the spider arms 18 are rollers 26 adapted to run on the track 12 and between the track 12 and a track 27 secured to the bottom of the tower 28. The base of the tower 28 (see Fig. 5) is also made of suitable timbers rigidly secured together by tie rods 29. Floor boards 8 are secured to the underneath side of the timbers 28 and the track 27 is secured to these floor boards.

The tower 31 is composed of suitable timbers as clearly illustrated in Fig. 1, so as to form a wooden frame trussed tower the posts of the tower being formed by timbers spliced as shown in Fig. 3 wherein a diagonal splice is shown at 32 circled by bands 33 and with bolts 34 passing through the bands and the ends of the timbers to firmly secure them together. The tower is also suitably trussed centrally by truss rods 35 bracing the upper part of the tower and at the base it is suitably trussed to the bottom 28 of the tower by truss rods 36 extending from the lower part of the tower to the base or bottom 28. Suitably mounted well up on the tower is a boom 37 constructed of timbers suitable trussed by truss rods 38 and with the timbers spliced and spaced apart as shown in Fig. 2 wherein 39 represents a splice in the timbers on one side and 40 a splice on the timbers on the other side, and 41, 41 represent spacing blocks between the two timbers. Bands 42 encircle the splice 39 one on each end thereof, and bands 43 encircle the splice 40 on each end thereof, while bands 44 and 45 encircle the splices centrally and pass around both timbers. Bolts 46 also pass through the timbers to more rigidly secure them together and hold the bands 34 and 35 in place and bolts 47 hold the bands 42 and 43 in place. On its inner end the timbers of the boom 37 are bolted to a U-shaped member 50 extending around the ends thereof. (See Figs. 13 and 14). A bolt 51 passes through the arms of the U-shaped member 50 and through the beams of the boom and passing about the bolt 51 is a V-shaped member 52 to which the inner ends of the truss rods 38 are connected. A band 53 may also encircle the inner end of the boom and the outer end of the U-shaped member 50. The inner end of the boom and U-shaped member 50 fits in between the arms 54 of a V-shaped member 60 and a bolt 55 passes therethrough to pivotally mount the boom between the arms 54 so that the boom may be raised and lowered about the bolt 55 as a pivot.

Bolted to the tower 31 is a cross member 56 to which is bolted two side members 57 extending outwardly therefrom and bolted to the outer ends of which is a pivot socket member 58, having integral therewith top and bottom cap members 61 and 62 respectively. (See also Fig. 12.) A member 63 having downwardly extending ends 64 secured to the tower 31, extends under the pivot socket member 58 and the whole is suitably braced by bracing members 64. The block member 60 is inserted in the pivot socket member 58 and a vertical pivot pin 65 inserted therethrough so that the boom is pivoted with respect to the tower so as to swing about a vertical axis. Thus the boom is connected to the tower by a universal joint intermediate the top and bottom of the tower.

At the top of the tower I provide roller bearings 70 carried by the tower, and surrounding the roller bearings 70 is a ring member or hand track 71 (see Figs. 10 and 11), which loosely rests upon plates 72 secured rigidly to the top of the tower. A suitable spindle 73 projects upwardly from the top of the tower and loosely fitting over the top of the spindle 73 is a four-armed spider 74 having its arms secured to the top of the ring 72 by brackets 105 and each of the arms having apertures therein as at 75 for engagement with guy ropes 76 suitably connected to ground. By this arrangement it will be seen that the top of the tower is provided with suitable pivot bearing means suitably guyed whereby the tower is capable of revolving about the axis of the spindle 73 as a center, the roller bearings 70 serving to decrease the frictional resistance when the tower is rotated.

A suitable rope 80, the outer end of which is connected to the boom passes over suitable pulleys at 81, 82 and 83 to a winding spool 84 (see Fig. 1). The winding spool 84 may be driven in any suitable manner as by motor or engine in order to raise and lower the boom 37 about the pivot 55. A rope 86 connected to the center part of the boom also passes over pulleys at 81, 82 and 83 and may be secured to any suitable stationary part to help support the boom 37. Arranged to be raised and lowered through the central part of the tower is a bucket 87 and for this purpose a rope 88, the lower end of which is connected to the bucket, passes up over a pulley 89 and down around a pulley 90 and thence to a winding drum 91 which may be driven in any well-known or suitable manner in order to raise and lower the bucket 87 in the tower. Secured to the upper part of the tower above the boom is a hopper 92 from the bottom of which lead concrete spouts 93 and 94 respectively. The spout 93 is connected to the boom 37 at 95 to be supported and positioned thereby. The spout 94 is supported from the end of the boom as by rope 96 and tackle 97 in order to be suitably positioned and supported by the boom.

In operation the bucket 87 is raised through the central part of the tower and tipped to deposit the concrete in the hopper 92 from which it may be caused to run down either of the spouts 93 or 94 to be deposited where desired for the purpose of making concrete construction. After that part of the concrete construction is built to certain height the whole tower may be rotated to a new position in order to give the boom a new field of operation. And in order to rotate the tower with respect to its base 10, I provide a block 98 secured to the bottom of the tower about which passes a rope 99. One end of the rope may be temporarily secured to the winding drum 84 and the other end of the rope is connected to the base of the tower at 100 after passing around a suitable pulley at a dead man or fixed post in the rear of the apparatus and not shown on the drawing, so that when the winding drum 84 winds up the rope 99 it causes the tower to be rotated (clockwise as viewed in Fig. 1) upon the base 10 and on the rollers 26 and tracks 12 and 27 as bearings. A rope and tackle similar to the rope 99 and tackle 98 may be provided on the other side of the tower for rotating the tower in the opposite direction. Carried rigid with the bottom of the tower and revoluble therewith, is a hopper 101 and a water tank 102 having a pipe 103 leading therefrom to the hopper 101 and the bottom of the hopper 101 connects with a concrete mixer 104 also revoluble with the tower. The outlet of the mixer 104 is adapted to deposit the concrete directly into the bucket 87. It will thus be seen that the concrete may be conveniently mixed on the base of the tower, the materials being put in the hopper 101 and water run thereinto from the tank 102 and the materials run into the mixer 104 where they are suitably mixed.

When the boom is not being raised or lowered the lower end of the rope 80 may be disconnected from the spool 84 and secured to the bottom of the tower so as to leave the spool 84 free for use to wind up the rope 99. As shown in Fig. 1 the tower is of wooden frame construction with uprights 110, horizontal pieces 111 and wooden cross pieces 112 all suitably secured together by bolts and lag screws. At spaced intervals I provide metallic reinforcing means for the tower as at 113 and 114 comprising angle irons 115 (see Fig. 15) bolted to the members 110 and 111 at the corners as by bolts 116 and carrying integral eyes 117 to which the truss rods 35 and 36 are attached, the upper portion of the tower being stiffened by the truss rods 35 and the truss rods 36 extending from a point intermediate the top and bottom of the tower to the bottom of the tower. The irons 115 are also provided with integral eyes 118, through which extend the ends of rods 119 and the whole set up by nuts 120 on the ends of rods 119 so that strong metallic reinforcing means is provided encircling the tower and to which the truss rods 35 and 36 are conveniently attached.

While I have described my improvements in great detail and with respect to a preferred embodiment thereof I do not desire to be limited to such details nor embodiments since changes and modifications may be made and the invention embodied in widely different forms without departing from the spirit and scope of the invention, particularly in its broader aspects.

What I claim as new and desire to secure by Letters Patent, is:—

1. Concrete distributing apparatus having in combination a wooden frame tower, a base for the tower, truss rods bracing the upper part of said tower, truss rods extending from the lower part of said tower, to said base, a second base, means whereby the tower and the first base are revoluble on said second base, said means including a track on each base, rollers interposed between the two tracks and a spider carrying said rollers, a boom connected to the tower by a universal joint intermediate the top and bottom of the tower, a hopper adapted to be carried by the tower above said boom, one or more concrete spouts leading from the hopper and supported by said boom, a concrete bucket, means for elevating the bucket so that concrete may be poured therefrom into the hopper, a concrete mixer carried by said first base, pivot bearing means for the tower at the top thereof, said pivot bearing means comprising a circular track having fixed relation to the ground, vertical pins having fixed relation to the tower, roller bearings freely rotatable on said pins and contacting with the inner periphery of said track.

2. Concrete distributing apparatus having in combination a wooden frame tower, a base for the tower, a second base, means whereby the tower and first base are revoluble on said second base, a boom connected at one end thereof to the tower by a universal joint intermediate the top and bottom of the tower, a rope for adjusting and supporting the boom passing upwardly and over a pulley adjacent the top of the tower and down within the tower, a hopper adapted to be carried by the tower above said boom, one or more concrete spouts leading from the hopper and supported by said boom, a concrete bucket, means for elevating the bucket so that concrete may be poured therefrom into the hopper, pivot bearing means for the tower at the top thereof, and guy ropes for connecting said means with the ground.

3. Concrete distributing apparatus having in combination a tower, a base for the tower, a second base, means whereby the tower and the first base are revoluble on said second base, a concrete mixer on said first base, a boom connected to the tower intermediate the top and bottom of the tower, said boom consisting of two arms, blocks between the arms to hold the arms apart, bands around the arms to hold the arms against the blocks, a pin passing through the arms, a band passing over the pin between the arms, and truss rods for the boom connected to the band and to the boom, a hopper adapted to be carried by the tower above said boom, one or more concrete spouts leading from the hopper and supported by said boom, means for elevating concrete from said mixer to said hopper, and pivot bearing means for the tower at the top thereof.

Signed at New York, in the county of New York and State of New York, this 18th day of April, A. D. 1919.

OTIS W. BREDEN.